United States Patent
Ueda

(10) Patent No.: US 7,265,806 B2
(45) Date of Patent: Sep. 4, 2007

(54) METHOD FOR PRODUCING LIQUID CRYSTAL DISPLAY

(75) Inventor: Michihisa Ueda, Mishima-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 105 days.

(21) Appl. No.: 10/532,075

(22) PCT Filed: Oct. 22, 2003

(86) PCT No.: PCT/JP03/13456

§ 371 (c)(1),
(2), (4) Date: Sep. 30, 2005

(87) PCT Pub. No.: WO2004/038494

PCT Pub. Date: May 6, 2004

(65) Prior Publication Data

US 2006/0109415 A1    May 25, 2006

(30) Foreign Application Priority Data

Oct. 22, 2002    (JP) .............................. 2002-307395

(51) Int. Cl.
*G02F 1/1339* (2006.01)
(52) U.S. Cl. ..................................................... 349/155
(58) Field of Classification Search ................. 349/155
See application file for complete search history.

(56) References Cited

U.S. PATENT DOCUMENTS

| | | | |
|---|---|---|---|
| 5,210,629 A * | 5/1993 | Kim | 349/187 |
| 5,328,728 A * | 7/1994 | Swirbel et al. | 427/600 |
| 7,136,139 B2 * | 11/2006 | Nam et al. | 349/189 |
| 2006/0268215 A1 * | 11/2006 | Choo et al. | 349/155 |

FOREIGN PATENT DOCUMENTS

| | | |
|---|---|---|
| JP | 9-230318 | 9/1997 |
| JP | 11-24083 | 1/1999 |
| JP | 11-065479 | 3/1999 |
| JP | 11-281935 | 10/1999 |
| JP | 11-281985 A | 10/1999 |
| JP | 2000-347191 A | 12/2000 |
| JP | 2001-188235 | 7/2001 |

* cited by examiner

*Primary Examiner*—James A. Dudek
(74) *Attorney, Agent, or Firm*—Sughrue Mion, PLLC

(57) ABSTRACT

It is an object of the present invention to provide a method of fabricating a liquid crystal display, which can prevent degradation in liquid crystal display performance such as contrast due to the cohesion of spacers and fabricate a liquid crystal display of high image quality, having high resolution.

The present invention relates to a method of fabricating a liquid crystal display, which has a step of ejecting spacer dispersion liquid obtainable by dispersing a spacer in a dispersion medium in a specific region of the surface of a substrate from a nozzle of an ink-jet system and locating the spacer in a specific region on the substrate, at least 80% by weight of the dispersion medium having a boiling point of 200° C. or lower and a contact angle of 5° or smaller on the substrate and in the step of locating the spacer in a specific region on the substrate, the spacer dispersion liquid being ejected in a specific region of the surface of the substrate at the interval of distribution S (μm), satisfying a relationship of the following formula (1):

$$S \geq 20 \times (V/D)^{1/2}, \quad (1)$$

in the formula, V represents droplet volume (pL) of the spacer dispersion liquid ejected once from a nozzle and D represents a particle diameter (μm) of the spacer contained in the spacer dispersion liquid.

1 Claim, 1 Drawing Sheet

METHOD FOR PRODUCING LIQUID CRYSTAL DISPLAY

TECHNICAL FIELD

The present invention relates to a method of fabricating a liquid crystal display by an ink-jet method, which can locate a spacer in a specific region on a substrate without cohesion and prevent degradation in liquid crystal display performance such as contrast due to cohesion of a spacer.

BACKGROUND ART

Currently, liquid crystal displays are widely used to personal computers, portable electronics and the like.

This liquid crystal display, as shown in FIG. 1, is generally constituted by forming transparent electrodes 3, alignment layers 9, color filters 4 and black matrixes 5 between two transparent substrates 1, locating polarizers 2 outside two transparent substrates 1, installing a sealing material 10 at the periphery of two transparent substrates 1, and encapsulating liquid crystal 7 in a gap between two transparent substrates 1 located on opposite sides of the sealing material 10 interposed. In this liquid crystal display, spacers 8 are used for the purpose of regulating the distance of two transparent substrates 1 and retaining a proper thickness (cell gap) of a liquid crystal layer.

Conventional liquid crystal displays have been fabricated by the following step.

1) A color filter substrate, in which a black matrix, a color filter, a transparent electrode, an alignment layer and the like are formed on a transparent substrate such as glass, and an electrode substrate, in which a pixel electrode such as a transistor, a diode device is formed on a transparent substrate, are previously fabricated. And, a driving circuit to drive the electrode is formed outside a portion corresponding to the color filter.

2) After the spacers are sprayed on the color filter substrate with a wet type or dry type sprayer, the color filter substrate on which the spacers are sprayed and the electrode substrate are bonded to each other while the electrode is carefully aligned with the color filter, using the sealing material. In addition, when applying the sealing material, a portion to be a filling port of liquid crystal is opened.

3) The sealing material is heated to be cured while applying an appropriate pressure to the bonded two substrates in such a way that the gap between the substrates becomes proper through the spacers.

4) In vacuum, the liquid crystal is filled by capillarity and then excessively filled liquid crystal is purged by the application of pressure and the filling port is sealed with an end-sealing material.

5) Spacers adhered to a portion corresponding to a driving circuit outside the sealing material and liquid crystal overflowing by the application of pressure are cleaned.

On the other hand, though in recent years, upsizing of a substrate is required, a conventional method, namely liquid crystal filling by capillarity, took too much time. And so, in order to resolve such a problem, there is proposed a method of producing by a drop method of liquid crystal, in which a sealing material is applied in advance and a precise amount of liquid crystal is dropped in a section divided with the sealing material and then substrates are bonded.

However, when the drop method of liquid crystal is employed, a problem that spacers sprayed even to the area outside the sealing material in the conventional spraying method cannot be removed has arises since there is not a cleaning step corresponding to the paragraph 5) of the conventional method of fabricating.

And, in recent years, there is fabricated a reflective and semi-transparent liquid crystal display, in which a part of the surfaces of pixels formed on either one of the substrates is provided with reflection layers having fine concavities and convexities.

But, in such a liquid crystal display, since there is produced a difference in height between two areas provided with a reflection layer and not provided with a reflection layer, particles sprayed at lower area by a conventional spraying method cannot contribute to retain a cell gap and a problem that the number of spacers to be sprayed must be increased in order to retain the cell gap has arisen.

In order to resolve such problems, methods of dispersing spacers, in which spacer dispersion liquid obtainable by dispersing spacers in a medium based on water is ejected on a substrate with an ink-jet system, are disclosed in Japanese Kokai Publication Hei-11-24083, Japanese Kokai Publication Hei-11-281935 and Japanese Kokai Publication 2001-188235. When a dispersing method using an ink-jet system is employed, since it is possible to disperse spacers in arbitrary region, it can be said that it is effective for resolving the problem.

However, in Japanese Kokai Publication 2001-188235, there is not described in detail a method of selecting a medium which can be used, and when a dispersion medium, which is based on water and has high surface tension, is used like Japanese Kokai Publication Hei-11-24083 and Japanese Kokai Publication Hei-11-281935, a problem that particles cohere arises. And, if the cohesion of particles occurs in a shading section (a non-display section), there is not a problem, but since the width of the shading section such as a black matrix has become narrow in recent years, it has become considerably difficult to constrain the cohesion of particles in a prescribed section even when alignment was carried out. In addition, when the cohesion of particles occurred not in a non-display section but in a display section, since transmittance was reduced, there was the case where display performance of a liquid crystal display such as contrast was degraded.

Further, in Japanese Kokai Publication Hei-11-24083, there was a description that when a medium having a low boiling point and low surface tension was used, spacers were resistant to cohesion, but when a large amount of spacer dispersion liquid was ejected in a certain area for the purpose of increasing the number of spacers to be sprayed, there was yet a problem of the occurrence of cohesion.

SUMMARY OF THE INVENTION

In view of the state of the art, it is an object of the present invention to provide a method of fabricating a liquid crystal display which can locate a spacer in a specific region on a substrate without cohesion and prevent degradation in liquid crystal display performance such as contrast due to cohesion of the spacer in the case of ejecting spacer dispersion liquid in a specific region of the surface of a substrate from a nozzle of an ink-jet system.

The present invention pertains to a method of fabricating a liquid crystal display, which has a step of ejecting spacer dispersion liquid obtainable by dispersing a spacer in a dispersion medium in a specific region of the surface of a substrate from a nozzle of an ink-jet system and locating the spacer in a specific region on the substrate, at least 80% by weight of the dispersion medium having a boiling point of 200° C. or lower and a contact angle of 5° or smaller on the substrate and in the step of locating the spacer in a specific region on the substrate, the spacer dispersion liquid being ejected in a specific region of the surface of the substrate at the interval of distribution S (μm), satisfying a relationship of the following formula (1):

$$S \geq 20 \times (V/D)^{1/2} \quad (1),$$

in the formula, V represents droplet volume (pL) of the spacer dispersion liquid ejected once from a nozzle and D represents a particle diameter (μm) of the spacer contained in the spacer dispersion liquid.

Figure 1:
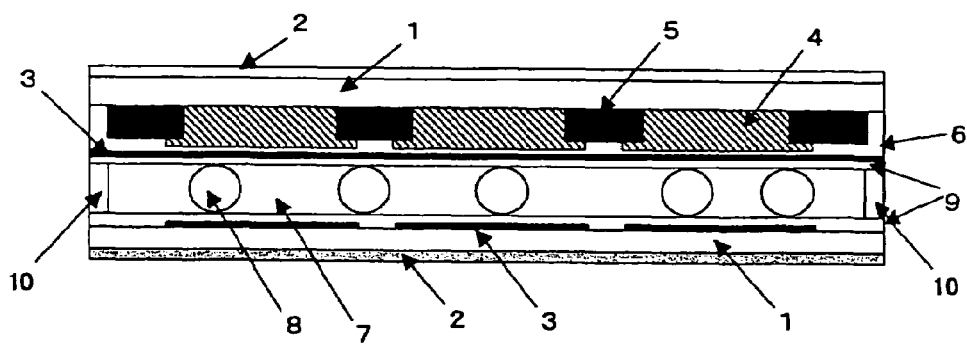
FIG. 1 is a schematic view showing a conventional liquid crystal display.

In the drawing, a reference numeral 1 represents a transparent substrate, a numeral 2 represents a polarizing plate, and numerals 3, 4, 5, 6, 7, 8, 9 and 10 represent a transparent electrode, a color filter, a black matrix, a overcoat, liquid crystal, a spacer, an alignment layer and a sealing material, respectively.

DETAILED DESCRIPTION OF THE INVENTION

Hereinafter, the present invention will be described in more detail.

In a method of fabricating a liquid crystal display of the present invention, spacer dispersion liquid obtainable by dispersing spacers in a dispersion medium is ejected in a specific region of the surface of a substrate from a nozzle of an ink-jet system.

The spacer dispersion liquid comprisies spacers and a dispersion medium.

The spacer is not particularly limited and includes, for example, inorganic silica particles and organic polymeric particles.

Among others, the organic polymeric particles are particularly suitably used since they have hardness of the order of not damaging an alignment layer formed on a substrate of a liquid crystal display and is easy to follow the change in thickness due to thermal expansion or thermal contraction, and further has an advantage that a shift of spacers within a cell is relatively less.

The organic polymeric particles are not particularly limited and a substance obtainable by polymerizing a mixture of a monofunctional monomer and a polyfunctional monomer is generally used for reasons of strength. In such a mixture of a monofunctional monomer and a polyfunctional monomer (hereinafter, also referred to as a polymerizable monomer), the proportion of the polyfunctional monomer is preferably 80% by weight or lower. When it is more than 80% by weight, there may be cases where the particle obtained by polymerizing does not have adequate strength as a spacer.

The monofunctional monomer is not particularly limited and includes, for example, styrene derivatives such as styrene, α-methylstyrene, p-methylstyrene, p-chlorostyrene and chloromethylstyrene; vinyl esters such as vinyl chloride, vinyl acetate and vinyl propionate; unsaturated nitriles such as acrylonitrile; (meth)acrylic acid ester derivatives such as methyl (meth)acrylate, ethyl (meth)acrylate, butyl (meth) acrylate, 2-ethylhexyl (meth)acrylate, stearyle (meth)acrylate, ethylene glycol (meth)acrylate, trifluoroethyl (meth) acrylate, pentafluoropropyl (meth)acrylate and cyclohexyl (meth)acrylate. These monofunctional monomers may be used alone or in combination of two or more species.

The polyfunctional monomer is not particularly limited and includes, for example, divinylbenzene, 1,6-hexanediol di(meth)acrylate, trimethylolpropane tri(meth)acrylate and the derivatives, tetramethylolmethane tri(meth)acrylate, tetramethylolpropane tetra(meth)acrylate, diallyl phthalate and the isomer, triallyl isocyanurate and the derivatives, pentaerythritol tri(meth)acrylate, pentaerythritol tetra(meth) acrylate, dipentaerythritol hexa(meth)acrylate, polyethylene glycol di(meth)acrylate of ethylene glycol di(meth)acrylate, polypropylene glycol di(meth)acrylate of propylene glycol di(meth)acrylate, polytetramethylene glycol di(meth)acrylate, neopentyl glycol di(meth)acrylate, 1,3-butylene glycol di(meth)acrylate, 2,2-bis[4-(methacryloxypolyethoxy)phenyl]propane di(meth)acrylate, 2,2-hydrogenated bis[4-(methacryloxypolyethoxy)phenyl]propane di(meth)acrylate and 2,2-bis[4-(acryloxyethoxypolypropoxy)phenyl]propane di(meth)acrylate. These polyfunctional monomers may be used alone or in combination of two or more species.

A method of producing spacers by polymerizing the polymerizable monomer is not particularly limited and includes, for example, suspension polymerization, seed polymerization, and dispersion polymerization.

The suspension polymerization is a method, in which a monomer composition comprising a polymerizable monomer and a polymerization initiator is dispersed in such a poor solvent that gives an intended particle diameter and polymerized.

As a dispersion medium used for the suspension polymerization, there is usually used a substance obtainable by adding a dispersion stabilizer to water. As the dispersion stabilizer, polymer compounds soluble in a dispersion medium are preferred and there are given, for example, polyvinyl alcohol, polyvinylpyrrolidone, methyl cellulose, ethyl cellulose, polyacrylic acid, polyacrylamide and polyethylene oxide. And, a nonionic or ionic surfactant is also applicable.

The conditions of polymerization in the suspension polymerization vary with species of the polymerizable monomer and the polymerization initiator, but usually preferably, polymerization temperature is 50 to 80° C. and polymerization time is 3 to 24 hours.

In the suspension polymerization, since polydisperse particles having a relatively wide particle size distribution can be obtained, it is necessary to conduct a classification operation when the obtained particles are utilized as a spacer. Accordingly, it is suitable for the purpose of producing particles of a wide variety of particle diameter.

The seed polymerization is a polymerization method in which by allowing the monodisperse seed particle synthesized by soap-free polymerization or emulsion polymerization to absorb further a polymerizable monomer and polymerizing it, a diameter of the particle is expanded to an intended particle diameter. An organic monomer used in the seed particle is not particularly limited, but as the composition of the seed particle, it is preferred to use a substance having a component close to that of a monomer in conducting seed polymerization in order to inhibit phase separation in the seed polymerization. And, from the viewpoint of making a particle diameter monodisperse, styrene and the derivatives are suitably employed. Since a particle size distribution of the seed particle is reflected on a particle size distribution after the seed polymerization, it is preferably as monodisperse as possible and Cv value is preferably 5% or less.

Preferably, a polymerizable monomer absorbed in the seed polymerization has a composition as close as possible to that of the seed particle since the phase separation between the polymerizable monomer and the seed particle tends to occur in the seed polymerization. For example, it is preferred to use an aromatic divinyl monomer when the component of the seed particle is a styrenic monomer, and to use an acrylic multivinyl monomer when it is an acrylic monomer.

And, on the occasion of the seed polymerization, a dispersion stabilizer may be used as required. As the dispersion stabilizer, a polymer material soluble in the dispersion medium, for example, a substance similar to that in suspension polymerization, can be used.

In the seed polymerization, an amount of a monomer, to which the seed particle is absorbed, to be blended is preferably 20 to 100 parts by weight of the polymerizable monomer to 1 parts by weight of the seed particle. When it is less than 20 parts by weight, the breaking strength of a crosslinked particle to be finally obtained may become insufficient, and when it is more than 100 parts by weight, a particle size distribution may widen due to cohesion between particles in seed polymerization.

The dispersion polymerization is a method, in which by conducting polymerization in a poor solvent system which dissolves a polymerizable monomer but does not dissolve a produced polymer and adding a polymer dispersion stabilizer to this system, the produced polymer is precipitated in the form of a particle. Generally, when a crosslinkable monomer is polymerized by the dispersion polymerization, the cohesion of the particle is apt to occur and it is difficult to obtain monodisperse crosslinked particles stably, but it becomes possible to obtain it by selecting conditions.

An amount of the crosslinkable monomer is preferably 50% by weight or higher with respect to the total amount of the polymerizable monomer. When it is less than 50% by weight, since the surface of a particle formed in polymerization is soft in the medium, impingement between the particles causes cohesion and a particle size distribution widens, and further it may result in cohesion body. And, even though monodispersity is retained, it may be possible to attain adequate breaking strength as a spacer when a crosslinking density becomes low.

The seed polymerization and dispersion polymerization match the purpose of producing the particles having a specified particle diameter in large quantity since monodisperse particles can be obtained without conducting a classification operation.

On the occasion of polymerization of the polymerizable monomer, a polymerization initiator can be used.

The polymerization initiator is not particularly limited and includes, for example, organic peroxides such as benzoyl peroxide, lauroyl peroxide, o-chlorobenzoyl peroxide, o-methoxybenzoyl peroxide, 3,5,5-trimethylhexanoyl peroxide, t-butylperoxy-2-ethylhexanoate and di-t-butyl peroxide; and azo compounds such as azobis(isobutyronitrile), azobis(cyclohexacarbonyl) and azobis(2,4-dimethylvaleronitrile).

Preferably, an amount of the polymerization initiator to be blended is 0.1 to 10 parts by weight to 100 parts by weight of the polymerizable monomer.

A dispersion medium used in the polymerization is appropriately determined depending on a polymerizable monomer to be used, but organic solvents such as acetonitrile, N,N-dimethylformamide, dimethyl sulfoxide, ethyl acetate, and further alcohols such as methanol, ethanol, propanol; cellosolves such as methyl cellosolve, ethyl cellosolve; ketones such as acetone, methyl ethyl ketone, methyl butyl ketone, 2-butanone; and hydrocarbons are suitable. Further, it may be used in the form of a solvent mixed with another organic solvent which is compatible with these, water or the like.

When the particles obtained by the methods of polymerization are used as a spacer of a display device, a certain strength is necessary.

When compressive elasticity modulus (referred to a 10% K value) at 10% deformation of a particle diameter is employed as an indicator of compressive strength of the particles, a 10% K value of the spacer of a display device is preferably 2000 to 15000 MPa. When it is less than 2000 MPa, the spacer may be deformed by press pressure in assembling it into a display device and a proper gap may not be maintained. When it is more than 15000 MPa, the spacer may damage the alignment layer on the substrate to cause display anomalies in incorporating it in a display device.

In addition, the 10% K value is measured according to a method described in Japanese Kokai Publication Hei-6-503180 in the present invention. In this method, by using Micro Compression Testing Machine ("PCT-200" manufactured by SHIMADZU CORPORATION), the obtained spacer is compressed at compression hardness of 0.27 g/sec and maximum test load of 10 g with a flat end face of a diamond column of 50 µm in diameter and a load in displacing it by 10% is measured. It is derived based on the following formula.

$$K = (29.4/\sqrt{2}) \times F \times S^{-3/2} \times R^{-1/2}$$

F: load value (N) at 10% compression deformation of particle

S: compression displacement (mm) at 10% compression deformation of particle

R: radius of particle (mm)

The spacer obtained by the method may be used in color in order to improve contrast of a display device. A method of coloring is not particularly limited and includes, for example, a method of treating the spacers with carbon black, disperse dye, acid dye, basic dye, metal oxide and the like; a method of forming an organic film on the surface of the spacer and decomposing or carbonizing it at elevated temperatures and coloring it. Further, when a material itself of the spacer has a color, it may be used as is without coloring.

And, the spacer obtained by the method may be provided with an adhesive layer on the surface or subjected to surface modification for preventing the alignment of liquid crystal surrounding the spacer from being disturbed. As a method of applying the surface modification, there are given, for example, a method of modifying by depositing a resin on the surface of the spacer as disclosed in Japanese Kokai Publication Hei-1-247154; a method of modifying by reacting a compound which can react with a functional group on the surface of the spacer as disclosed in Japanese Kokai Publication Hei-9-113915; and a method of modifying by conducting graft polymerizatin on the surface of the spacer as disclosed in Japanese Kokai Publication Hei-11-223821. A method of forming a surface layer chemically combined on the surface of a spacer is suitable because it is possible to prevent peeling of the surface layer or elution of the surface layer into liquid crystal in a cell of a liquid crystal display. Among others, as disclosed in Japanese Kokai Publication Hei-9-113915, a method of conducting graft polymerization by reacting a spacer having a reducing group on the surface with an oxidizing agent and producing a radical on the surface of the particle is more preferred in that it is possible to form a surface layer having a high density and a sufficient thickness.

The dispersion medium may be a substance comprising a single medium or a mixed medium obtainable by mixing a plurality of mediums, but when it is a mixed medium, at least 80% by weight has a boiling point of 200° C. or lower and a contact angle of 5° or smaller on a substrate.

That is, when the dispersion medium is a mixed medium, a single dispersion medium having a boiling point of 200° C. or lower and a contact angle of 5° or smaller on a substrate makes up at least 80% by weight of the overall dispersion medium or a total of a plurality of mediums having a boiling point of 200° C. or lower and a contact angle of 5° or smaller on a substrate makes up at least 80% by weight of the overall dispersion medium.

In the case where the dispersion medium is a substance comprising a single medium, when the boiling point is higher than 200° C., since it takes much time to evaporate it, the spacers cohere in the droplet of the spacer dispersion liquid landed in the substrate after ejected or an alignment layer applied to the substrate is damaged. Incidentally, a boiling point, used herein, refers to a boiling point at atmospheric pressure. In addition, when a contact angle on a substrate is larger than 5°, since a droplet does not spread and the spacer becomes able to move within the droplet after the droplet lands in the substrate and a probability that spacers move closer to one another increases as the droplet is evaporated, the spacers becomes apt to cohere. Incidentally, the contact angle on a substrate refers to a contact angle of the medium with respect to a substrate and can be measured with a commercially available contact angle measuring apparatus.

If the proportion of a dispersion medium having a boiling point of 200° C. or lower in the dispersion medium is less than 80% by weight, since it takes much time to evaporate it, spacers may cohere within the droplet landed in the substrate after ejected or an alignment layer formed on the substrate is damaged. When the proportion of a medium having a contact angle of 5° or smaller on a substrate is less than 80% by weight, a contact angle on a substrate of a droplet immediately after landed in it become large and the spacers cohere early in evaporation. Further, when the proportion of a medium having a boiling point of 200° C. or lower and a contact angle of 5° or smaller on a substrate is less than 80% by weight, a contact angle on a substrate of a droplet immediately after landed in it become large and the spacers cohere early in evaporation and since it takes much time to evaporate the droplets, spacers may cohere within the droplet landed in it after ejected or an alignment layer formed on the substrate is damaged.

As the dispersion medium, a substance, of which a contact angle on a substrate does not become large when the spacer dispersion liquid is evaporated, is preferably used. Accordingly, when the dispersion medium is a mixed medium, it is preferred to select and blend a substance having a smaller contact angle on a substrate for a medium having a higher boiling point. When a medium having a high boiling point has a large contact angle on a substrate, a problem that since a contact angle on a substrate of the droplet of the spacer dispersion liquid landed in it becomes large with evaporation, the spacers cohere late in evaporation arises. The spacer dispersion liquid wets and spreads over it early in evaporation, but a phenomenon that many smaller droplets are developed within the spacer dispersion liquid wetting and spreading over it as the evaporation proceeds arises. And the cohered spacers may be located not at a certain distance but at random.

Preferably, the dispersion medium has the surface tension of 18 to 35 mN/m. When it is less than 18 mN/m, it may be difficult to control droplet volume when ejecting the dispersion medium from a nozzle of an ink-jet system, and when it is more than 35 mN/m, it becomes difficult to set the contact angle on a substrate at 5° or smaller.

As the dispersion medium, various mediums can be used as long as they satisfy the conditions but water-soluble or hydrophilic liquid is preferred. In addition, since nozzle heads of some ink-jet systems are fabricated for water applications, use of a highly hydrophobic medium as a dispersion medium is not preferred because it may affect a member composing a nozzle head or dissolve a part of adhesives bonding the member. And, as a dispersion medium for the spacer dispersion liquid, there is used a medium not having an alignment layer-contaminating property such as penetrating into the alignment layer or dissolving the alignment layer.

The medium is not particularly limited and includes, for example, C4 alcohols such as ethanol, n-propanol, 2-propanol (isopropyl alcohol); 1-butanol, 2-butanol; C5 alcohols such as 1-pentanol, 2-pentanol, neopentyl alcohol; C6 alcohols such as 1-hexanol; monoalcohols such as 1-methoxy-2-propanol, furfuryl alcohol, tetrahydrofurfuryl alcohol; polymers of ethylene glycol such as ethylene glycol, diethylene glycol, triethylene glycol, tetraethylene glycol; lower monoalkyl ethers such as monomethyl ether, monoethyl ether, monoisopropyl ether, monopropyl ether and monobutyl ether of these polymers, respectively; lower dialkyl ethers such as dimethyl ether, diethyl ether, diisopropyl ether and dipropyl ether of the polymers, respectively; alkyl esters such as monoacetate and diacetate of these polymers, respectively; polymers of propylene glycol such as propylene glycol, dipropylene glycol, tripropylene glycol, tetrapropylene glycol; lower monoalkyl ethers such as monomethyl ether, monoethyl ether, monoisopropyl ether, monopropyl ether and monobutyl ether of these polymers, respectively; alkyl esters such as monoacetate and diacetate of these polymers, respectively; diols such as 1,3-propanediol, 1,2-butanediol, 1,3-butanediol, 1,4-butanediol, 3-methyl-1,5-pentanediol, 3-hexene-2,5-diol, 1,5-pentanediol, 2,4-pentanediol, 2-methyl-2,4-pentanediol, 2,5-hexanediol, 1,6-hexanediol, neopentyl glycohol; ether derivatives and acetate derivatives of these diols; polyhydric alcohols such as glycerin, 1,2,4-butanetriol, 1,2,6-hexanetriol, 1,2,5-pentanetriol, trimethylol propane, trimethylol ethane, pentaerythritol; ether derivatives and acetate derivatives of these polyhydric alcohols; dimethyl sulfoxide, thiodiglycol, N-methyl-2-pyrrolidone, N-vinyl-2-pyrrolidone, γ-butyrolactone, 1,3-dimethyl-2-imidazolidine, sulfolane, formamide, N,N-dimethylformamide, N-methylformamide, acetamide, N-methylacetamide, α-terpineol, ethylene carbonate, propylene carbonate, bis(β-hydroxyethyl)sulfone, bis(β-hydroxyethyl) urea, N,N-diethylethanolamine, abietynol, diacetone alcohol and urea and the like.

And, water may be used as the dispersion medium. When water is used, it is preferred to adjust the content to be 20% by weight or lower of the overall dispersion medium.

The viscosity of the spacer dispersion liquid is preferably 0.5 to 15 mPa·s. When it is lower than 0.5 mPa·s, it may become impossible to stably eject the spacer dispersion liquid, for example, it becomes difficult to control droplet volume. When it is higher than 15 mPa·s, it may become impossible to eject it with an ink-jet system. It is more preferably 2 to 10 mPa·s. In addition, liquid temperature in ejecting may be adjusted between −5 to 50° C., for example, by controlling a temperature of an ink-jet head of an ink-jet system in such a way that the viscosity falls within a preferable range.

The concentration of solid matter in the spacer in the spacer dispersion liquid is preferably 0.05 to 5% by weight and more preferably 0.1 to 2% by weight. When it is less than 0.05% by weight, the number of spacers in a droplet ejected from a nozzle decreases and a distribution density cannot be increased. When it is more than 5% by weight, a nozzle of an ink-jet system becomes apt to clog or the number of spacers contained in a landed droplet becomes too many and the spacers become apt to cohere during the course of drying.

And, spacers are preferably dispersed in the form of a single particle in the spacer dispersion liquid. When cohesion matter is present in the spacer dispersion liquid, not only they cause the reduction in ejection accuracy of an ink-jet system, but also they may cause clogging of a nozzle of an ink-jet system in an extreme case.

A method of dispersing the spacers is not particularly limited and includes a method of irradiating ultrasonic wave to the spacer dispersion liquid and the like. In addition, when the spacers are dispersed using the method of dispersing spacers, it is preferred to maintain a state of dispersion of the spacer dispersion liquid by stirring or using a dispersion medium of which a specific gravity is close to that of the spacer.

Further, it is possible to prevent the cohesion of spacers from occurring in ejecting the spacer dispersion liquid by irradiating ultrasonic wave to the spacer dispersion liquid within the nozzle of the ink-jet system. In addition, to the spacer dispersion liquid, adhesive component for imparting adhesion may be added or a variety of surfactants, viscosity modifiers or the like may be added for the purpose of improving the dispersion of the spacers, and the ejection accuracy through controlling physical properties such as the surface tension and the viscosity, and the mobility of the spacer.

Next, an ink-jet system ejecting the spacer dispersion liquid onto the substrate will be described. The ink-jet system is not particularly limited and common ejection methods such a piezo ink-jet method in which liquid is ejected by vibrations of a piazoelectric element; and a thermal ink-jet method in which liquid is ejected using the expansion of liquid by rapid heating can be employed. Incidentally, in the piezo ink-jet method, liquid is drawn to an ink chamber close to the piazoelectric element or ejected from the ink chamber through a nozzle tip.

A diameter of a nozzle hole of the ink-jet system is preferably within a range of 7 to 15 times larger than a particle diameter of the spacer. If the nozzle hole diameter is less than 7 times larger than a particle diameter, when the spacers are ejected, ejection accuracy is reduced due to the too small nozzle hole diameter compared with the particle diameter, and extremely, the ejection of the spacers may become impossible due to nozzle clogging. Since the particle diameter of the spacer is generally 1.5 to 10 μm, the nozzle hole diameter is preferably 10 μm or larger.

The reason why when the nozzle hole diameter of the ink-jet system is too small compared with the particle diameter, ejection accuracy is reduced in ejecting the spacers will be described as follows.

As a method of ejecting droplets in the ink-jet system, there are a drawing method in which a meniscus (interface between ink and vapor) at a nozzle tip is drawn in immediately before the ejection and then liquid is pushed out, and a pushing method in which liquid is pushed out directly from a position where a meniscus is at rest on standby. In any method of the drawing method or the pushing method, the reduction in ejection accuracies results from that droplets are ejected from a nozzle not straight ahead but at an angle. Accordingly, whether droplets are ejected straight ahead from an ink-jet system or not highly depends on uniformity of the interface (meniscus) shape of the spacer dispersion liquid at the nozzle tip and it is thought that the uniformity of the meniscus shape is broken due to passage of a relatively large droplet and it causes the reduction in ejection accuracies.

In common ink-jet systems, the drawing method goes mainstream and the drawing method has a feature that small droplets can be ejected. In the ejection of the droplets of the spacer dispersion liquid, since it is required to smaller droplets, drawing method is effective. In the drawing method, the meniscus is drawn in immediately before the ejection, and when the nozzle hole diameter is small such as less than 7 times larger than a particle diameter, and the spacer exists in the vicinity of the meniscus drawn in, the meniscus is not drawn in axisymmetrically and therefore the droplets goes not straight ahead but at an angle in pushing out after drawing in, leading to the reduction in the ejection accuracies.

And, when the nozzle hole diameter is 15 times larger than a particle diameter or larger than 150 μm, the ejected droplet becomes large, and therefore, the droplets coalescing, the spacers may tend to cohere.

An amount of droplet ejected onto the substrate from a nozzle (an amount of the spacer dispersion liquid ejected per one cycle from a nozzle) is preferably 10 to 80 pL. When it is less than 10 pL, a state of ejection becomes unstable and there may be cases where it is not ejected, and when it is more than 80 pL, since an amount of droplet becomes much, droplets may cohere in landing and spacers and spacers may be apt to cohere.

As a method of controlling the amount of droplet, there are given a method of optimizing the nozzle hole diameter and a method of optimizing the electric signals controlling an ink-jet head. Among others, the method of optimizing the electric signals controlling an ink-jet head is especially important in an ink-jet system of a piezo ink-jet method.

In the nozzle of the ink-jet system, a plurality (for example, 64 or 128) of nozzles are generally located at an ink-jet head in a fixed arrangement form such as a constant distance in the direction perpendicular to the direction of ink-jet head movement. In addition, there may be cases where such nozzles are installed in multiple rows.

The nozzle distance is restricted by a configuration of a piazoelectric element or the like or a nozzle diameter. Therefore, it is difficult to install the ink-jet head to match the interval of distribution when the nozzle distance is different from the interval of distribution. When the interval of distribution is smaller than the nozzle distance, an ink-jet head (nozzle), generally located perpendicularly to the scanning direction of ink-jet head, is inclined on the plane parallel to the substrate or rotated while being kept in parallel to the substrate and the spacer dispersion liquid is ejected. And, when the interval of distribution is larger than the nozzle distance, the spacer dispersion liquid is ejected by ejecting with only a part of nozzles instead of all nozzles or by inclining the ink-jet head (nozzle).

Further, it is feasible to mount a plurality of ink-jet heads on an ink-jet system for the purpose of increasing productivity, but it requires caution since an increase in the number of ink-jet heads causes the increase in complexity of the control.

In the method of fabricating a liquid crystal display of the present invention, in the step of locating the spacer in a specific region on the substrate, the spacer dispersion liquid is ejected in a specific region of the surface of the substrate at the interval of distribution S (μm), satisfying a relationship of the following formula (1):

$$S \geq 20 \times (V/D)^{1/2} \tag{1}$$

Here, an adjustment of the interval of distribution is performed by the method. In the formula, V represents droplet volume (pL) of the spacer dispersion liquid ejected once from a nozzle and D represents a particle diameter (μm) of a spacer contained in the spacer dispersion liquid.

Here, the interval of distribution expressed by S refers to a distance between centers of adjacent droplets among the spacer droplets landed in the substrate.

When the interval of distribution S does not satisfying the formula (1), coalescence between droplets of the spacer dispersion liquid wetting and spreading over it occurs and therefore not only it takes an evaporation time period more than necessary, but also the ejected spacer dispersion liquid spreads in film form and therefore the spacer can move freely in a liquid film and a probability that spacers cohere before evaporation becomes high or the number of sprayed spacers may varies from location to location.

As a specific region where the spacers are located, there are given, for example, a whole region inside the sealing material for the case where the spacers are located in fabricating a liquid crystal display of drop method of liquid crystal, and either region of a reflection portion or a transmission portion for the case where the spacers are located in fabricating a reflective and semi-transparent liquid crystal display.

As a result of being ejected at the interval of distribution S, it is preferred that the density of spacers to be located is generally 10 to 350 per an area of 1 mm square. When it is less than 10, a proper cell gap cannot be retained, and when it is more than 350, the spacers may cohere.

And, the ejection of the spacers can be divided into multiple ejections. In this case, spacers may be ejected changing the direction of the shift alternately every time (reciprocating ejection) or ejected only during the shift to one direction (one way ejection).

Next, a step of evaporating the spacer dispersion liquid landed in the substrate will be described.

A method of evaporating the spacer dispersion liquid is not particularly limited and includes, for example, methods of heating the substrate or blowing hot air, but it is preferred that it is in the condition of not generating the cohesion between spacers in evaporation stage. That is, if the spacer dispersion liquid is evaporated by a method in which an evaporation time period is lengthened, a probability that spacers cohere before evaporation becomes high and the spacer dispersion liquid makes contact with an alignment layer for a long time, and therefore the alignment layer may be contaminated and the display image quality of a liquid crystal display may be impaired. Also, when the spacer dispersion liquid is evaporated at elevated temperatures with intent to evaporate quickly, the alignment layer may be contaminated to impair the display image quality of a liquid crystal display.

In the method of fabricating a liquid crystal display of the present invention, a liquid crystal display can be obtained by using a substrate, on which spacers are located, fabricated in the step of locating the spacers on the substrate and an opposed substrate, pressing them under heating using a peripheral sealing material, further filling liquid crystal into the gap between two substrates and locating the substrate provided with the spacers and the opposite substrate on opposite sides of the spacers and the liquid crystal interposed. Incidentally, in a drop method of liquid crystal, a sealing material is applied in advance and a precise amount of liquid crystal is dropped in a section divided with the sealing material and then substrates are bonded.

The spacer dispersion liquid is preferably ejected onto the surface of one substrate of two substrates constituting a liquid crystal display.

The substrate is not particularly limited and includes, for example, a substrate comprising glass or a resin sheet, generally used as panel substrates of liquid crystal displays. A resin thin film for regulating an alignment of the liquid crystal molecule, referred to as an alignment layer, is generally formed on the surface of the substrate. The alignment layer is not particularly limited but a polyimide resin is generally used and the alignment of liquid crystal molecule is regulated by being subjected to rubbing of the surface.

Further, in addition to adjusting the surface tension of the spacer dispersion liquid as described, the contact angle of the spacer dispersion liquid on a substrate can be reduced by employing an alignment layer having high surface energy and therefore the spacers can be located without cohesion. Preferably, the alignment layer having high surface energy has surface energy of 25 mN/m or larger, more preferably 30 mN/m or larger.

In the method of fabricating a liquid crystal display of the present invention, since at least 80% by weight of the dispersion medium has a boiling point of 200° C. or lower and a contact angle of 5° or smaller on a substrate and in the step of locating the spacers in a specific region on the substrate, the spacer dispersion liquid is ejected at the interval of distribution S (μm) satisfying a relationship of the formula (1) in a specific region of the surface of a substrate, spacers can be located in a desired region without cohesion. Therefore, it is possible to prevent degradation in liquid crystal display performance such as contrast due to the cohesion of spacers and to fabricate a liquid crystal display of high image quality, having high resolution.

BEST MODES FOR CARRYING OUT THE INVENTION

Hereinafter, the present invention will be described in more detail by way of examples, but the present invention is not limited to these examples.

EXAMPLE 1

(Preparation of Particles for Spacers)

In a separable flask, 15 parts by weight of divinylbenzene, 5 parts by weight of isooctyl acrylate and 1.3 parts by weight of benzoyl peroxide as a polymerization initiator were mixed uniformly, and 20 parts by weight of a 3% aqueous solution of polyvinyl alcohol ("GL-03" produced by KURARAY CO., LTD.) and 0.5 parts by weight of sodium dodecyl sulfate were further added and stirred well, and then 140 parts by weight of ion-exchanged water was added. The obtained solution was reacted at 80° C. for 15 hours under nitrogen flow while being stirred to obtain particles for spacers. The obtained particles for spacers were washed with hot water and acetone and then classified, and the acetone was volatilized to prepare spacers (I). An average particle diameter of the spacers (I) was 4.5 μm and a CV value was 3.0%. According to the similar method, there were prepared spacers (II) having an average particle diameter of 2.5 μm and a CV value of 3.0% and spacers (III) having an average particle diameter of 6.0 μm and a CV value of 3.0%.

(Surface Modification of Spacers)

5 parts by weight of the obtained spacers (II) was added to a mixture of 20 parts by weight of dimethyl sulfoxide, 10 parts by weight of dodecyl methacrylate and 10 parts by weight of polyethylene glycol monomethyl ether methacrylate, and dispersed with a sonicater, and then the mixture was stirred uniformly. Further, a nitrogen gas was introduced into a reaction system and the mixture was continuously stirred at 45° C. for 2 hours. To this, 10 parts by weight of a 0.1 mol/L of the solution of ceric ammonium nitrate prepared by a 1N aqueous solution of nitric acid was added and a reaction was continued for 5 hours.

After the completion of polymerization reaction, a reactant was taken out and separated into particles and a reaction solution using a 3 μm membrane filter. These particles were adequately washed with ethanol and acetone and then dried under reduced pressure with a vacuum dryer to obtain spacers surface modified.

(Preparation of Spacer Dispersion Liquid)

The obtained spacers was taken by an amount required to obtain a given concentration and 1-hexanol was gradually added as a medium and, dispersed by being adequately stirred using a sonicater to obtain a spacer dispersion liquid A.

The obtained spacer dispersion liquid A was filtered with a stainless screen with mesh size of 10 μm to remove cohesion matter and subjected to evaluation test in an ink-jet system.

(Locating of Spacers by Ink-jet Method)

By applying uniformly a polyimide solution ("SUNEVER 150" produced by NISSAN CHEMICAL INDUSTRIES, LTD.) onto a color filter glass substrate, in which an ITO transparent electrode was provided on the surface and a black matrix of 25 μm in width is formed between pixels (distance of 150 μm in length and 75 μm in width) of a color filter by spin coating, drying at 150° C. and then baking at 230° C. for 1 hour to cure, a substance provided with an alignment layer was obtained.

The spacer dispersion liquid A was ejected onto a substrate heated to 60° C. at the droplet volume and the interval of distribution (distance of each locating) shown in Table 2 with an ink-jet system of a piezo ink-jet system, on which a nozzle head having a nozzle hole diameter of 40 μm is mounted. Further, heating of the substrate was conducted by a heater attached to a stage and a distribution density of the spacers ejected on the substrate was 200/mm$^2$.

Next, after visually recognizing that the spacer dispersion liquid A was completely evaporated, the substrate, on which the spacer dispersion liquid A was ejected, was shifted to on a hot plate heated to 150° C. and heated in order to further evaporate the spacer dispersion liquid and to make the spacers adhere to the substrate and was left for 30 minutes. The obtained substrate provided with the obtained spacers located and the opposed substrate were bonded at their periphery using a sealing material and the sealing material was cured by heating at 150° C. for 1 hour, and then an empty cell was produced in such a way that a cell gap is equal to a particle diameter of the spacer and liquid crystal was filled into the cell by a vacuum method and a filling port was sealed with an end-sealing material to obtain a liquid crystal display.

(Evaluation)

(1) State of Locating of Spacer

A substrate, on which the spacer dispersion liquid was ejected, was heated at 150° C. for 30 minutes and a state of locating of the spacer after the droplet was evaporated was evaluated according to the following criteria. And, $20 \times (V/D)^{1/2}$ was determined from the particle diameter of a spacer D and the droplet volume V. The results were shown in Table 2.

○: There were few cohesion.

○-Δ: A few blocks comprising two or three spacers were recognized.

Δ: Some blocks comprising two or three spacers were recognized.

x: Many blocks comprising five or more spacers were recognized.

(2) Display Image Quality of Liquid Crystal Display

○: There were few effects due to the spacers.

Δ: Reduction in contrast resulting from the cohered spacers occurred slightly.

x: Reduction in contrast resulting from the cohered spacers occurred.

EXAMPLES 2 TO 10 AND COMPARATIVE EXAMPLES 1 TO 6

Liquid crystal displays were fabricated and evaluated by following the same procedure as in Example 1 except for using the dispersions of spacers B to H and RA to RC shown in Table 1 and locating the spacers onto the substrate at the droplet volume and the interval of distribution (distance of each locating) shown in Table 2. The results were shown in Table 2.

TABLE 1

| Spacer dispersion liquid | | bp | θ | A | B | C | D | E | F | G | H | RA | RB | RC |
|---|---|---|---|---|---|---|---|---|---|---|---|---|---|---|
| Amount of | isopropyl alcohol | 82 | 0 | | | 20 | | | | | 85 | | 20 | 10 |
| solvent | 2-butanol | 100 | 0 | | | | 100 | | | | | | | |
| blended | 1-butanol | 118 | 0 | | | | | | | 85 | | | | |
| (% by | neopentyl alcohol | 114 | 0 | | | | | 100 | | | | | | |
| weight) | 1-hexanol | 157 | 0 | 100 | 100 | 70 | | | 100 | | | | | |
| | 1-nonanol | 214 | 3 | | | | | | | | 100 | | | |
| | ethylene glycol | 198 | 51 | | | | | | | | | | 40 | |
| | water | 100 | 77 | | | 10 | | | | 15 | 15 | | 40 | 90 |
| Concentration of solid matter in spacer (wt %) | | | | 0.5 | 0.5 | 0.5 | 0.5 | 0.5 | 0.5 | 0.5 | 0.5 | 0.5 | 0.5 | 0.5 |
| Spacer | species | | | II | I | I | I | I | III | I | I | I | I | I |
| | particle diameter D (μm) | | | 2.5 | 4.5 | 4.5 | 4.5 | 4.5 | 6 | 4.5 | 4.5 | 4.5 | 4.5 | 4.5 | bp: boiling point of sovent (° C.),
θ: contact angle on substrate (deg)

TABLE 2

| | Spacer dispersion liquid | Particle diameter D (μm) | Droplet volume V (pL) | $20 \times (V/D)^{1/2}$ (μm) | Interval of distribution vertical (μm) | Interval of distribution horizontal (μm) | State of locating of spacer | Display image quality |
|---|---|---|---|---|---|---|---|---|
| Example 1 | A | 2.5 | 25 | 63 | 100 | 100 | ○ | ○ |
| Example 2 | B | 4.5 | 25 | 47 | 100 | 100 | ○ | ○ |
| Example 3 | B | 4.5 | 50 | 67 | 100 | 100 | ○ | ○ |
| Example 4 | B | 4.5 | 75 | 82 | 100 | 100 | ○ | ○ |
| Example 5 | C | 4.5 | 25 | 47 | 100 | 100 | ○ | ○ |
| Example 6 | D | 4.5 | 25 | 47 | 100 | 100 | ○ | ○ |
| Example 7 | E | 4.5 | 25 | 47 | 100 | 100 | ○ | ○ |
| Example 8 | F | 6.0 | 40 | 52 | 100 | 100 | ○ | ○ |
| Example 9 | G | 4.5 | 25 | 47 | 100 | 100 | ○ | ○ |
| Example 10 | H | 4.5 | 25 | 47 | 100 | 100 | ○–Δ | ○ |
| Comparative Example 1 | B | 4.5 | 50 | 67 | 50 | 50 | x | x |
| Comparative Example 2 | B | 4.5 | 50 | 67 | 50 | 50 | x | x |
| Comparative Example 3 | F | 6.0 | 40 | 52 | 50 | 50 | Δ | Δ |
| Comparative Example 4 | RA | 4.5 | 25 | 47 | 100 | 100 | Δ | Δ |
| Comparative Example 5 | RB | 4.5 | 25 | 47 | 100 | 100 | x | x |
| Comparative Example 6 | RC | 4.5 | 25 | 47 | 100 | 100 | x | x |

It was found from Table 2 that in the liquid crystal displays obtained in Examples 1 to 10, the spacers were located with very little occurrence of cohesion and display image quality was excellent but in the liquid crystal displays obtained in Comparative Examples 1 to 6, the cohesion of the spacers occurred or the contamination of alignment layers were generated due to use of the medium having a high boiling point, and display image quality was poor. Further, in the liquid crystal displays obtained in Comparative Examples 4, there was observed degradation of image quality resulting from the contamination of alignment layers.

INDUSTRIAL APPLICABILITY

In accordance with the method of fabricating a liquid crystal display of the present invention, it is possible to prevent degradation in liquid crystal display performance such as contrast due to the cohesion of spacers and to fabricate a liquid crystal display of high image quality, having high resolution.

The invention claimed is:

1. A method of fabricating a liquid crystal display, which has a step of ejecting spacer dispersion liquid obtainable by dispersing a spacer in a dispersion medium in a specific region of the surface of a substrate from a nozzle of an ink-jet system and locating the spacer in a specific region on the substrate,
at least 80% by weight of the dispersion medium having a boiling point of 200° C. or lower and a contact angle of 5° or smaller on the substrate and
in the step of locating the spacer in a specific region on the substrate, the spacer dispersion liquid being ejected in a specific region of the surface of the substrate at the interval of distribution S (μm), satisfying a relationship of the following formula (1):

$$S \geq 20 \times (V/D)^{1/2} \tag{1}$$

in the formula, V represents droplet volume (pL) of the spacer dispersion liquid ejected once from a nozzle and D represents a particle diameter (μm) of the spacer contained in the spacer dispersion liquid.

* * * * *